United States Patent [19]

Lester, Jr.

[11] 4,038,947
[45] Aug. 2, 1977

[54] FROG FEEDING APPARATUS

[76] Inventor: Dozier Lester, Jr., Rte. 1, Box 156F, Duson, La. 70529

[21] Appl. No.: 704,245

[22] Filed: July 12, 1976

[51] Int. Cl.² ............................................. A01K 5/02
[52] U.S. Cl. .................................................. 119/51 R
[58] Field of Search ........................ 119/51 R, 52 AF

[56] References Cited
U.S. PATENT DOCUMENTS 2,259,876  10/1941  Berland ............................ 119/51 R
2,555,437   6/1951  Edwards .......................... 119/51 R Primary Examiner—Hugh R. Chamblee
Attorney, Agent, or Firm—John M. Harrison

[57] ABSTRACT

An apparatus for feeding frogs which includes a suspended frame carrying a motor driven conveyor chain equipped with several spaced carrying members, each designed to transport a food carrier, to which is attached a line having a particle of food secured to the free end thereof. As the conveyor chain is caused to move, the food is pulled at a predetermined speed across the surface or floor area in the vicinity of the frogs, thereby imparting movement and simulating a lifelike action to the food particles. The apparatus is automated and is adapted to continually supply new food particles to the frogs while simultaneously retrieving and collecting the food carriers for additional use.

10 Claims, 14 Drawing Figures

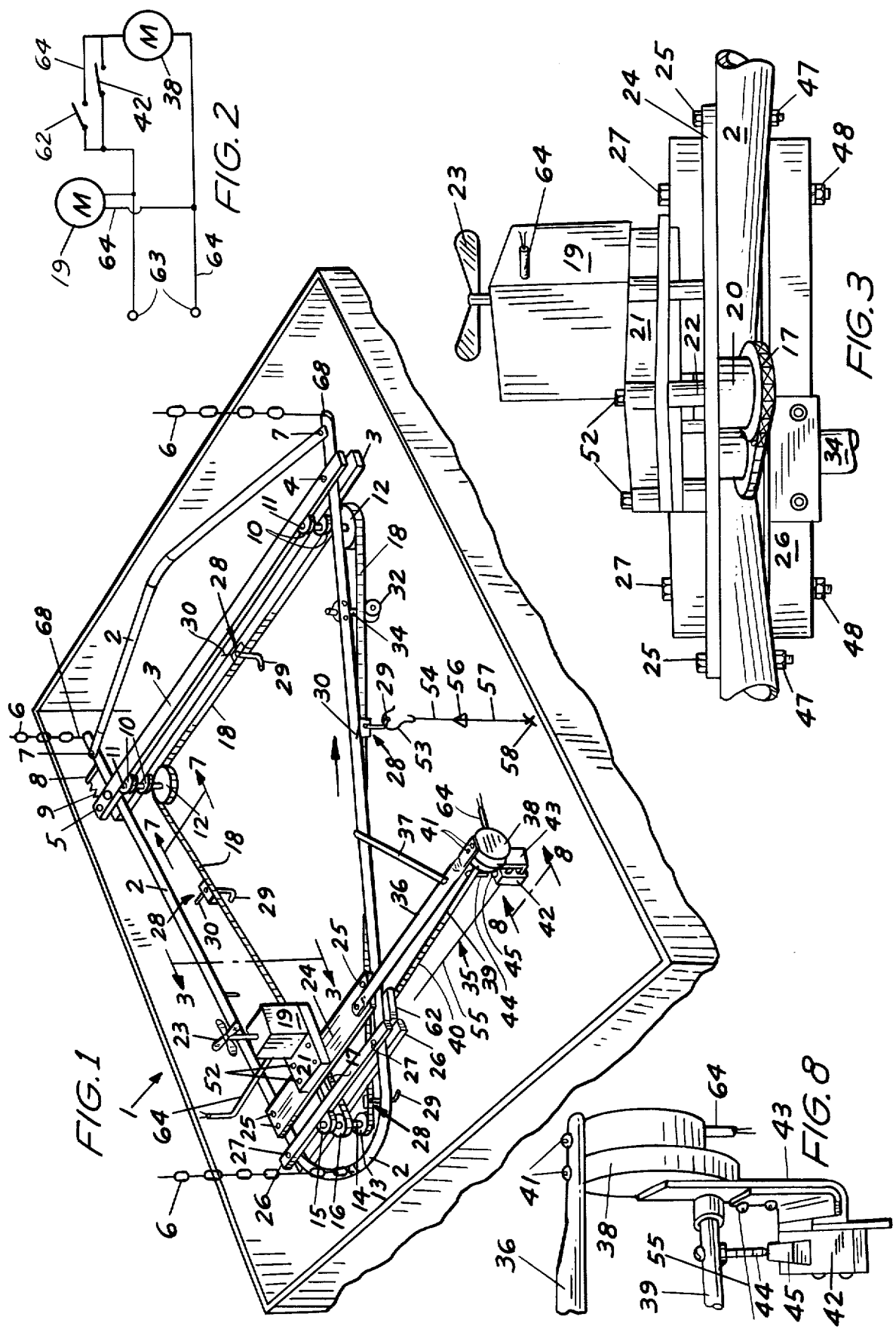

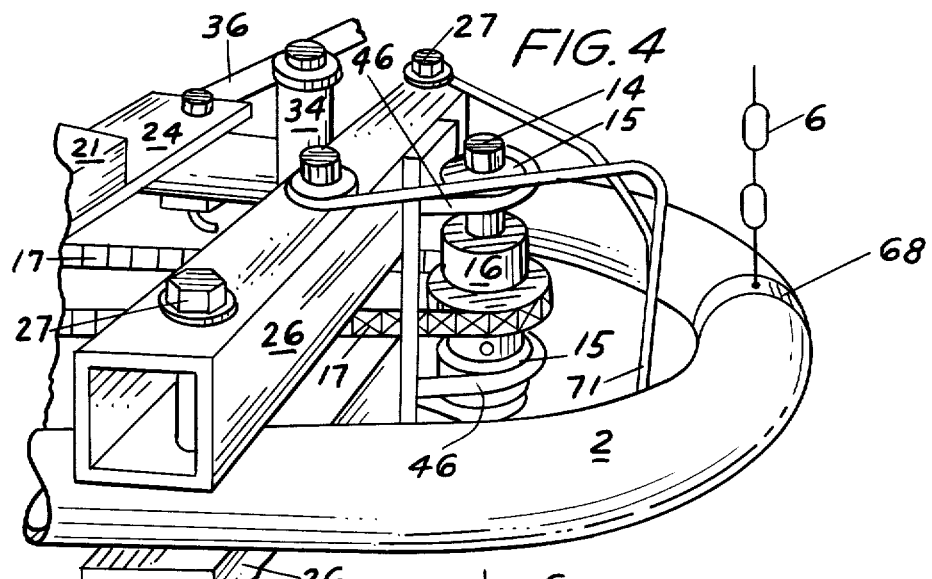
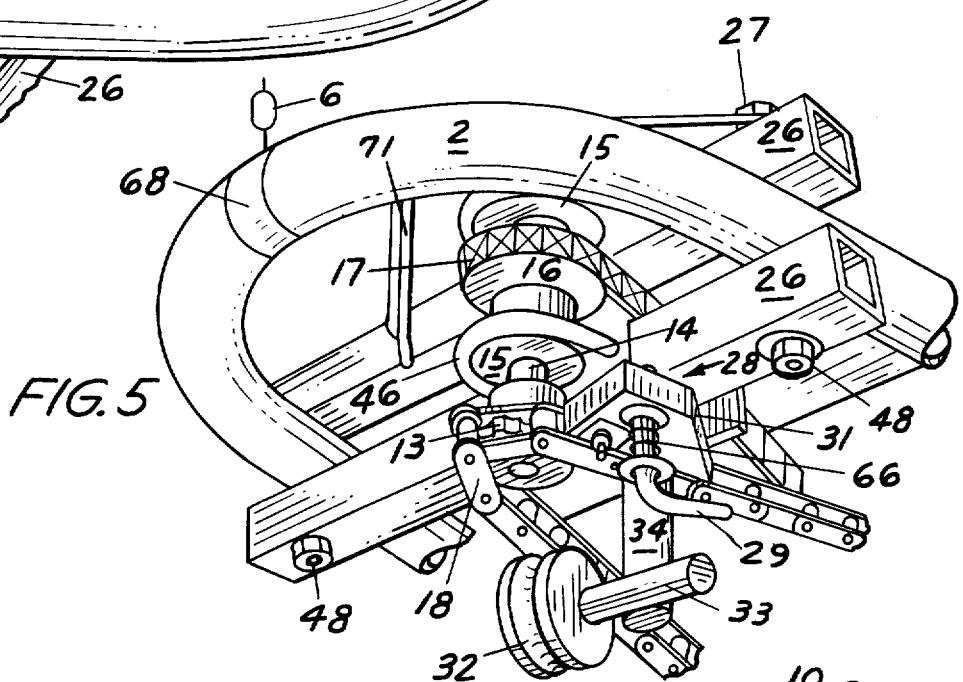
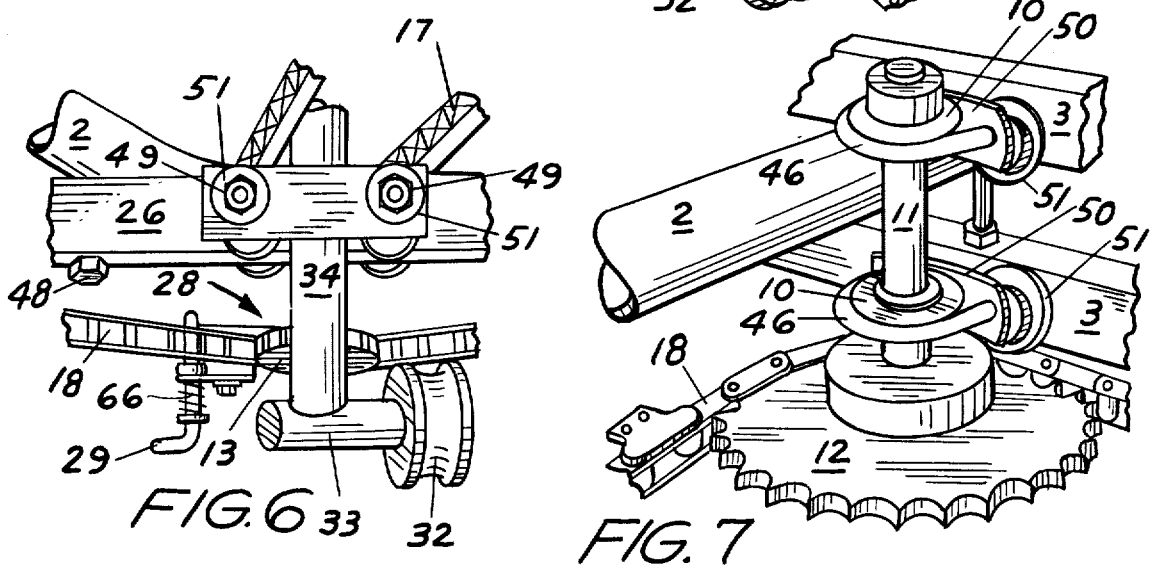
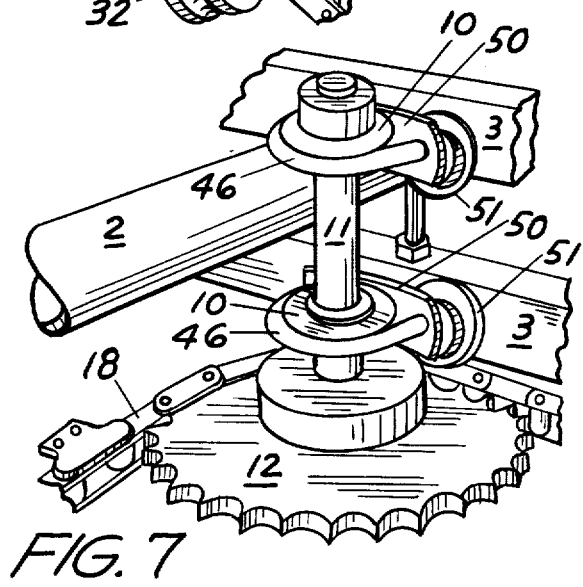

FROG FEEDING APPARATUS

BACKGROUND OF THE INVENTION

Cross-Reference to Related Applications

A frog feeding apparatus for feeding frogs on a relatively small scale is disclosed and claimed in my copending patent application Ser. No. 626,040, filed Oct. 28, 1975, and a food for frogs is disclosed and claimed in my copending patent application Ser. No. 518,060, filed Oct. 25, 1974.

FIELD OF THE INVENTION

This invention relates to an apparatus for feeding frogs by means of an overhead mounted mechanism which effects movement of particles of a selected frog food across a surface area in the vicinity of frogs to trigger the feeding instinct of the frogs. The apparatus of this invention may be used in both commercial and private frog raising operations. The apparatus is automated and is capable of dispensing a series of food particles in predetermined, spaced and timed relationship to each other at a predetermined speed. The carriers for delivering the food may be automatically gathered and stored for re-use, as desired.

DESCRIPTION OF THE PRIOR ART

Many experiments have been conducted regarding the feeding of frogs, and particularly with the idea of developing a food which is palatable to frogs and which may be used in large scale frog raising operations. A chief problem encountered in the development of such foods is the reluctance of the frog to eat any food other then live food such as insects, minnows, worms, and crawfish. In the course of investigation it became apparent that a primary factor in the successful feeding of frogs was the necessity for movement of the food offered to frogs. Apparently such movement triggers the feeding instinct in the frog, and it has been found that a frog will not eat at all, no matter how hungry it becomes, if the food is not actually alive or, in the alternative, if artificial food is not presented to it in a lifelike manner. By the term "artificial food" is meant non-living food.

Heretofore, there have been developed no known effective means for presenting non-living food to frogs on a large scale basis in such a manner that the frogs would eat. Not only do the frogs apparently need a living or simulated living stimulus to trigger the feeding instinct, but the food must also be of such texture as to stimulate the frog to swallow after the food is received in its mouth. Accordingly, existing commercial feeding operations known to the applicant have generally been limited to the provision of live insects, worms, minnows and crawfish for feeding frogs. Such feeding techniques are difficult because of the limited availability of living food such as insects, minnows and crawfish during certain seasons. Presenting such food to frogs in an environment where the food can be readily captured and eaten is difficult. Therefore, the problem is simply the difficulty of supplying sufficient live food to meet the demands of frogs, particularly in the case of large scale frog raising operations.

Accordingly, an object of this invention is to provide an overhead mounted, automated mechanism for imparting lifelike movement to non-living or artificial food for frogs.

Yet another object of this invention is to provide an overhead frog feeding conveyor mechanism which utilizes a moving conveyor and a means for suspending the food particles to cause the food to move in a lifelike manner as it is carried by the conveyor.

Yet another object of this invention is to provide an automated frog feeding mechanism which is characterized by an overhead suspended frame having a motor driven conveyor system mounted thereon with a multiplicity of carrying devices and food carriers for suspending the food from the conveyor and dragging it at a predetermined speed in the vicinity of the frog in order to induce the frog to feed.

A still further object of the invention is to provide an overhead mounted frog feeding apparatus which is equipped to automatically dispense the food carriers and automatically retrieve and store the carriers after the food has been removed by the frogs in feeding.

SUMMARY OF THE INVENTION

These and other objects of the invention are provided in a frog feeding apparatus which includes the following elements:

1. An overhead suspended frame;
2. A motor driven conveyor carried by the frame and adapted to traverse the frame at a predetermined speed;
3. Several spaced carrier mechanisms connected to the conveyor;
4. Carriers carried by the carrier mechanisms for moving food in the vicinity of the frogs; and
5. Means for automatically dispensing the carriers at a predetermined spacing on the conveyor and retrieving the carriers after the food has been removed from the carriers by the frogs during the feeding operation.

BRIEF DESCRIPTION OF THE DRAWINGS

The invention will be better understood in view of the following description presented with reference to the accompanying drawings:

FIG. 1 of the drawing is a perspective view of the overhead frog feeding apparatus of this invention;

FIG. 2 is a schematic of a typical electrical system which supplies power to the conveyor system and to the dispensing system in the apparatus illustrated in FIG. 1;

FIG. 3 is a rear perspective view, taken along lines 3—3 in FIG. 1, and partially in section, of the drive motor, drive motor gear box, drive motor sprocket and drive chain of the feeding apparatus illustrated In FIG. 1;

FIG. 4 is a left side perspective view, partially in section, of the drive chain sprocket, drive chain, and drive chain sprocket mounts of the apparatus illustrated in FIG. 1;

FIG. 5 is a bottom perspective view, partially in section, of the drive chain sprocket, forward chain sprocket, conveyor chain, frame, drive chain sprocket mounts and a carrier mechanism of the apparatus illustrated in FIG. 1;

FIG. 6 is a rear perspective view, partially in section, of the forward section of the apparatus illustrated in FIG. 1, more particularly showing the drive chain sprocket mounts, conveyor chain idler mount, forward chain sprocket, and conveyor chain;

FIG. 7 is a side perspective view, taken along lines 7—7 in FIG. 1, and partially in section, of one of the rear chain sprockets and assembly, and the relationship of the assembly and conveyor chain to the frame and tension members of the apparatus illustrated in FIG. 1;

FIG. 8 is a side perspective view, taken along lines 8—8 in FIG. 1, and partially in section, of the feeder motor, feeder microswitch and cam assembly which operate to release the carriers of the apparatus illustrated in FIG. 1;

DESCRIPTION OF THE PREFERRED EMBODIMENTS

Figure 9:
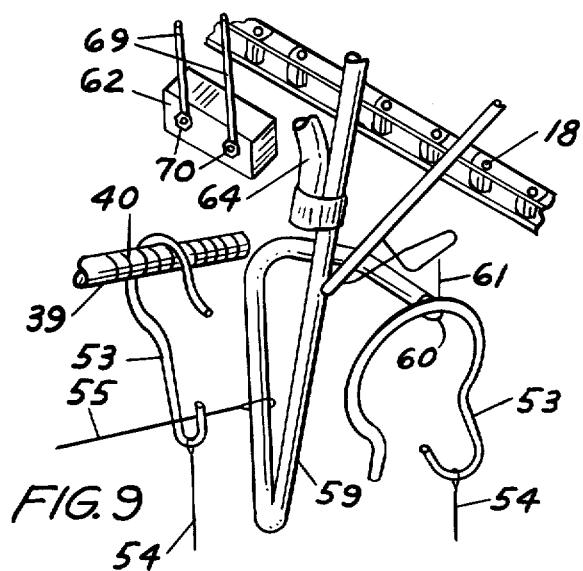
FIG. 9 is a rear perspective view, partially in section, of the feeder unloading and pick-up mechanisms of the feeding apparatus illustrated in FIG. 1, with a carrier ready to be picked up and carried by one of the carrier mechanisms mounted on the conveyor chain.

Referring now to FIG. 1 of the drawings, the apparatus of this invention, generally represented by reference numeral 1, is shown with frame 2, assembled with frame bolts 7 and suspended over a collection of frogs by means of suspension chains 6 and suspension chain mounts 68. Tension members 3, located at the rear of frame 2 and pivoted on frame 2 by means of pivot bolt 4, are designed to adjust the tension on conveyor chain 18, which is positioned immediately below frame 2 by means of forward chain sprocket 13 and rear chain sprockets 12, more particularly illustrated in FIGS. 5 and 7, respectively, of the drawings.

Referring particularly now to FIG. 7, conveyor chain 18 is designed to mesh with rear chain sprockets 12, which are in turn mounted to tension members 3 by means of rear chain sprocket shaft 11 and rear chain sprocket bearings 10. U bolts 46, with cooperating U bolt braces 50, U bolt nuts 49 and washers 51, (more particularly illustrated in FIG. 6 of the drawings) serve to securely mount rear chain sprockets 12 to tension members 3. Since the left hand member of frame 2 as apparatus 1 is viewed from the front in FIG. 1 is slidably disposed between tension members 3, which are in turn pivoted on the right hand member of frame 2, the tension in conveyor chain 18 can be adjusted by biasing tension members 3 to the rear by means of tension bolt 5, tension mount 8 and cooperating spring 9. As further illustrated in FIG. 1 of the drawings, a sprocket arrangement similar to that illustrated in FIG. 7 is positioned at a second apex of the triangle created by frame 2 at the right hand rear of apparatus 1 when viewed from the front.

Referring now to FIGS. 4 and 5 of the drawings, forward chain sprocket 13 is carried by forward chain sprocket shaft 14 and is secured to drive chain sprocket mounts 26 by means of forward chain sprocket bearings 15 and U bolts 46, with cooperating U bolt nuts 49 and washers 51 (more particularly illustrated in FIG. 6). Forward chain sprocket shaft 14 also carries drive chain sprocket 16, more particularly illustrated in FIG. 4 of the drawing.

Referring now to FIGS. 3 and 4, drive chain 17 serves to link drive chain sprocket 16 to drive motor sprocket 20. Drive motor sprocket 20 is in turn driven by drive motor 19 by application of drive motor gear box 21 and drive motor gear box shaft 22, as illustrated in FIG. 3 of the drawing. Drive motor fan 23 serves to cool drive motor 19, and drive motor mount plate 24 provides a firm base upon which to position drive motor gear box 21 and drive motor 19. Drive motor gear box 21 is secured to drive motor mount plate 24 by drive motor gear box bolts 52. Drive motor mount plate 24 is in turn secured to flame 2 by means of drive motor mount plate bolts 25 and drive motor mount plate nuts 47. Drive chain sprocket mounts 26 are also securely positioned on frame 2 by means of drive chain sprocket mount bolts 27 and drive chain sprocket mount nuts 48, and serve to securely position both forward chain sprocket 13 and drive chain sprocket 16 firmly in place on frame 2.

Figure 12:
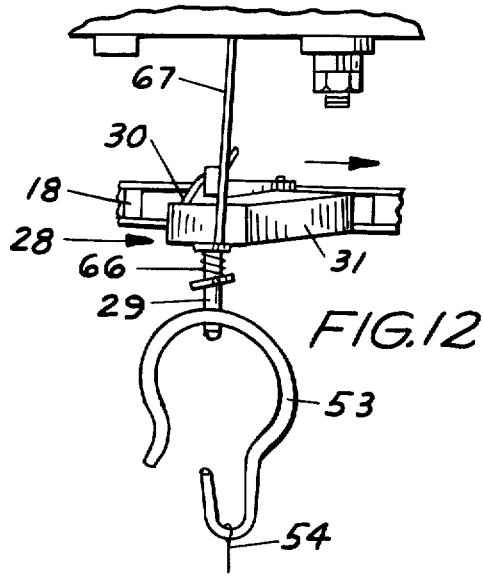
FIG. 12 is a side perspective view, partially in section, of the carrier and carrier mechanism illustrated in FIGS. 10 and 11, more particularly pointing out the selective positioning of the L hook as the carrier mechanism traverses the frame by means of the conveyor chain.
Figure 13:
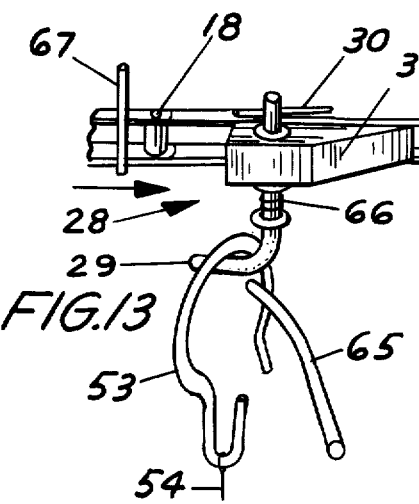
FIG. 13 is another side perspective view, partially in section, of the carrier and carrier mechanism illustrated in FIGS. 10, 11 and 12, more particularly pointing out still another position of the carrier L hook as the conveyor chain advances.
Figure 14:
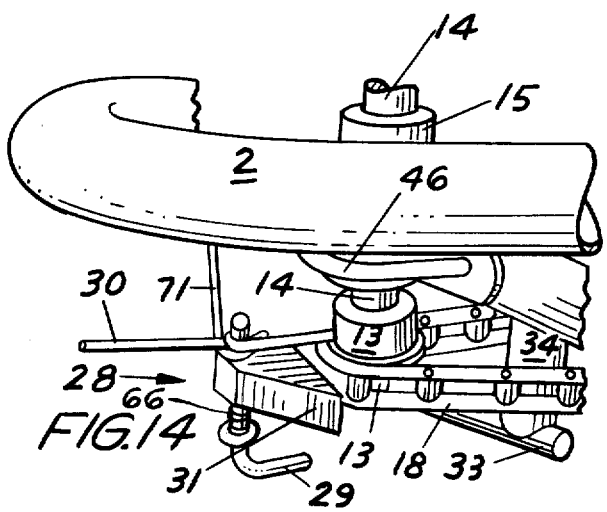
FIG. 14 is a side perspective view, partially in section, of a portion of the forward end of the apparatus illustrated in FIG. 1, more particularly illustrating repositioning of the carrier L hook as the carrier mechanism moves around the front of the apparatus.

Referring again to FIGS. 1 and 5 of the drawings, conveyor chain 18 is fitted with carrier mechanisms 28 disposed at a predetermined distance from each other, and each of which are designed to support a carrier L hook 29, rotatably journalled in carrier mechanisms 28 and biased in place by mean of a carrier L hook spring 66. A carrier turn pin 30 is positioned on top of each carrier L hook 29, as illustrated in FIGS. 11-14, and serves to engage first carrier L hook turner 67 as illustrated in FIG. 12, to position carrier L hook 29 in discharge position, as hereinafter described. Carrier L hook 29 is subsequently repositioned to a loading configuration by contact between carrier turn pin 30 and second carrier L hook turner 71, as shown in FIG. 14. Carrier mechanism faces 31 of carrier mechanisms 28 are disposed at an angle with respect to conveyor chain 18 for a purpose hereinafter also disclosed.

Referring again to FIG. 5 of the drawings, conveyor chain idler 32, carried by conveyor chain idler shaft 33 and conveyor chain idler mount 34 is designed to support conveyor chain 18 to prevent undesirable sag in the chain. A similar idler system is mounted toward the rear of the apparatus of this invention on the right hand member of frame 2, as illustrated in FIG. 1 of the drawings.

Referring again to FIGS. 1 and 8 of the drawings, the feeder mechanism of apparatus 1, generally illustrated by reference numeral 35, is mounted on frame 2 by means of feeder mount 36 and feeder mount brace 37. Feeder motor 38 is carried on feeder mount 36 by means of feeder motor screws 41. Feeder motor 38 also carries feeder shaft 39 equipped with feeder shaft threads 40 at the end thereof, as illustrated. Referring to FIG. 8, feeder motor 38 is more particularly illustrated, with feeder shaft microswitch mount 43 carrying feeder shaft microswitch 42, equipped with feeder microswitch trigger 45. Feeder shaft microswitch cam 44 is positioned securely on feeder shaft 39 and is designed to rotate with feeder shaft 39 and to contact and activate feeder microswitch trigger 45 on each revolution of feeder shaft 39, as hereinafter disclosed.

Figure 10:
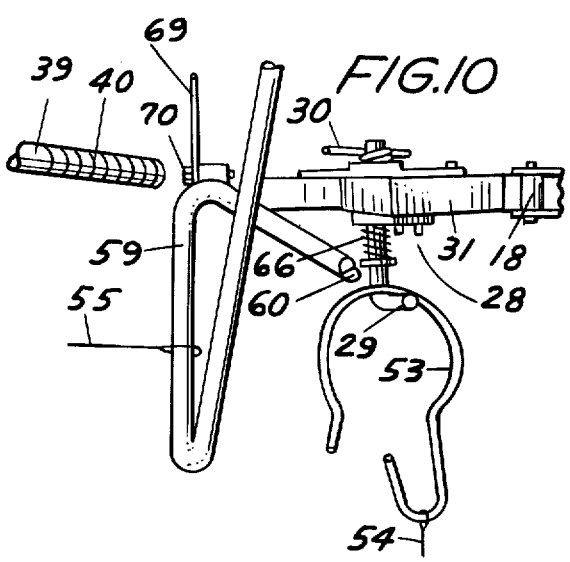
FIG. 10 is another rear perspective view, partially in section, of the feeder unloading and pick-up mechanisms of the feeding apparatus illustrated in FIG. 1, illustrating pick-up of a carrier by one of the carrier mechanisms of the invention.
Figure 11:
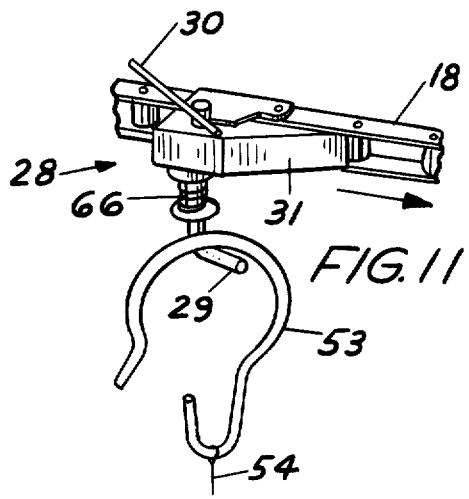
FIG. 11 is a side perspective view, partially in section, of a carrier mechanism and carrier, and the conveyor chain, which carrier mechanism is equipped with an L hook for transporting the carrier.

Referring now particularly to FIGS. 1, 9 and 10 of the drawings, one of carriers 53 is positioned on a carrier L hook 29, having previously rested on carrier launch seat 60 of carrier launch 59. One end of one of carrier lines 54 is tied to each one of carriers 53, and the other end carries a separator 56 (illustrated in FIG. 1). Each separator 56 in turn carries a food line 57, which extends below the separator 56, and to the terminal end of which is removably fixed a selected frog food particle 58. It will be appreciated by reference to FIGS. 9 and 10, that each of carriers 53 is designed to be picked up in sequence as conveyor chain 18 moves carrier L hook 29 past carrier launch seat 60 and carrier launch retainer 61. Carrier separator line 55, extending from feeder shaft microswitch mount 43 to carrier launch 59, as particularly illustrated in FIGS. 8 and 9 of the drawing, serves to separate and prevent entanglement of each one of carrier lines 54 when several carriers 53 are arranged on feeder shaft 39 to be sequentially picked up by carrier L hooks 29.

Referring again particularly to FIGS. 1 and 9 of the drawings, microswitch 62 is positioned on frame 2 by means of microswitch mounts 69 and microswitch mount nuts 70. Microswitch 62 is positioned in essentially parallel relationship to, and is spaced from conveyor chain 18, and the microswitch trigger attached thereto [not illustrated] is positioned in the space between microswitch 62 and conveyor chain 18. This positioning of microswitch 62 permits contact between the microswitch trigger and each one of carrier mechanism faces 31 of carrier mechanisms 28 as carrier mechanisms 28 traverse frame 2 and move past microswitch 62 on conveyor chain 18.

Referring again to FIG. 2 of the drawing, a simple preferred schematic of the electrical system is illustrated, with drive motor 19 and feeder motor 38 energized by a power source across terminals 63. Appropriate wiring 64, a portion of which is also illustrated in FIG. 9 of the drawing, is provided in order to facilitate energizing of both drive motor 19 and feeder motor 38, and effect traversal of conveyor chain 18 on rear chain sprockets 12 and forward chain sprocket 13. Feeder motor 38 is selectively energized by operation of microswitch 62, and feeder motor 38 in turn activates feeder shaft microswitch 42 by means of feeder shaft microswitch cam 44, to selectively feed carriers 53 onto each carrier L hook 29, as hereinafter described.

In operation, the feeding mechanism of this invention is initially set in motion by energizing drive motor 19 which causes conveyor chain 18 to traverse rear chain sprockets 12 and forward chain sprocket 13 by the action of drive chain 17, operating on drive motor sprocket 20 and drive chain sprocket 16. As conveyor chain 18 moves, carrier mechanisms 28, disposed at selected points on conveyor chain 18, also move in a counterclockwise direction and sequentially traverse microswitch 62 and the cooperating microswitch trigger [not illustrated], the latter of which is depressed each time it is contacted by each one of carrier mechanism faces 31 of carrier mechanisms 28. Depression of the microswitch trigger energizes feeder motor 38, which in turn causes feeder shaft 39 to turn and drive feeder shaft microswitch cam 44 against feeder microswitch trigger 45, causing feeder shaft microswitch 42 to close, and feeder shaft 39 to stop rotating and thereby effect a single rotation of feeder shaft 39, which is disposed in a slightly downward pitch. This action causes one of several carriers 53 loaded on feeder shaft 39 to rotate off feeder shaft threads 40 onto carrier launch 59 and carrier launch seat 60, as illustrated in FIG. 9 of the drawings. Carrier launch retainer 61 serves to prevent each one of carriers 53 from falling off carrier launch seat 60 before being picked up by a carrier L hook 29, as illustrated in FIG. 9 of the drawings. As carriers 53, positioned on launch seat 60, are sequentially picked up by a carrier L hook 29, and are caused to traverse frame 2 by means of the movement of conveyor chain 18, a food particle 58 attached to carriers 53 by means of each respective food line 57 and one of carrier lines 54, is caused to traverse the floor in the vicinity of the frogs below feeding mechanism 1 at the same selected speed as conveyor chain 18. The moving food particle 58 simulates a living organism, the frog feeding instinct is triggered, and the food is quickly removed from each food line 57 by a frog. This loading of carriers 53 is repeated, and as carrier mechanisms 28 sequentially approach and pass first carrier L hook turner 67, carrier turn pin 30 engages first carrier L hook turner 67 and causes carrier L hook 29 to turn to a position 180° disposed from its former position, as it approaches carrier receiver 65. Referring now to FIG. 13 of the drawing, since carrier L hook 29 is now facing rearwardly as conveyor chain 18 advances, carrier receiver 65 engages each one of carriers 53 in turn, and removes carriers 53 for collection on carrier receiver 65. Additional advancement of carrier mechanisms 28 on conveyor chain 18 causes engagement of carrier turn pin 30 with seocnd carrier L hook turner 71, which effects another 180° reversal of carrier L hook 29 back to its original position, so that carrier L hook 29 may now pick up another one of carriers 53 from carrier launch seat 60 of carrier lauch 59, and the process repeated, as heretofore described.

Referring again to FIG. 8 of the drawings, it will be appreciated that as feeder shaft 39 rotates due to activation of feeder motor 38 by contact between each of carrier mechanism faces 31 and the microswitch trigger of microswitch 62, the rotation of feeder shaft 39 is caused to stop by contact between feeder shaft microswitch cam 44 and feeder microswitch trigger 45. This prevents the release of more than one of carriers 53 loaded on feeder shaft 39 from feeder shaft threads 40 onto carrier launch 59. Accordingly, many food-laden carriers 53 can be arranged on feeder shaft 39, and the apparatus will automatically dispense a single one of carriers 53 for each one of carrier mechanisms 28, over a desired period of time. Furthermore, all carriers 53 which have completed the cycle are automatically collected on carrier receiver 65 as illustrated in FIG. 13, and these are removed after a period of time, resupplied with food, and again placed on feeder shaft 39 to repeat the feeding cycle. The food particles are replaced manually, typically by means of paper connectors and glue.

It is apparent that the overhead frog feeding apparatus of this invention is characterized by substantial convenience and utility, since sufficient food can be automatically dissemminated to feed many frogs in a desired time interval. The speed of the feeding process can be varied, the size of the food particles altered depending upon the size of the frogs to be fed, and the distance between moving particles easily adjusted, as desired.

Accordingly, having described my invention with the particularity set forth above, what is claimed is:

1. A frog feeding apparatus comprising:
   a. a frame located above a frog enclosure;
   b. a conveyor rotatably carried by said frame;
   c. drive means in cooperation with said conveyor to facilitate rotation of said conveyor with respect to said frame;
   d. a plurality of carrier means positioned in spaced relationship on said conveyor;
   e. a plurality of carriers having frog food attached thereto and removable carried by said carrier means;
   f. release means in cooperation with said frame and said conveyor for automatically dispensing said carriers sequentially on said plurality of carrier means as said carrier means traverse said frame on said conveyor; and
   g. collection means in cooperation with said frame and said conveyor and positioned at a predetermined point with respect to said frame and said conveyor for sequentially collecting said carriers after said frog food has been removed from said carriers.

2. The apparatus of claim 1 wherein said drive means is an electric motor and a cooperating drive chain and drive motor sprocket system and is located on said frame.

3. The apparatus of claim 1 wherein said conveyor in a conveyor chain and said plurality of carrier means is a plurality of carrier mechanisms carried by said chain and fitted with L hooks rotatably journalled in said carrier mechanisms for sequentially engaging said carriers, transporting said carriers around the periphery of said frame as said carriers are positioned for engagement by said release means, and traversing said collection means to effect collection of said carriers after said frog food has been removed from said carriers.

4. The apparatus of claim 1 wherein said carriers are shaped hooks having a line attached thereto and carrying a particle of frog food on the opposite end of said line.

5. The apparatus of claim 1 wherein:
   a. said drive means is an electric motor and a cooperating drive chain and drive motor sprocket system and is located on said frame;
   b. said conveyor is a conveyor chain and said plurality of carrier means is a plurality of carrier mechanisms carried by said conveyor chain and fitted with L hooks pivotally mounted in said carrier mechanisms for sequentially engaging said carriers, transporting said carriers around the periphery of said frame as said carriers are positioned for engagement by said release means and rotating into collection position to effect collection of said carriers after said frog food has been removed from said carriers; and
   c. said carriers are shaped hooks having a line attached thereto and carrying a particle of frog food on the opposite end of said line.

6. The apparatus of claim 1 wherein said release means further comprises:
   a. a first microswitch mounted on said frame and positioned in close proximity to the path of said conveyor to contact each of said carrier means as said carrier means traverse said frame and sequentially pass said microswitch;
   b. a feeder motor carried by said frame and in electrical cooperation with said first microswitch;
   c. a second microswitch carried by said frame and in electrical cooperation with said feeder motor; and
   d. a threaded feeder shaft carrying a plurality of carriers on respective threads thereof, and rotatably carried by said feeder motor, said thread feeder shaft also supporting a cam in perpendicular relationship, whereby when said first microswitch is activated in sequence by each of said carrier means as said conveyor chain traverses said frame, said feeder motor is activated and said feeder shaft and said cam are caused to rotate, one of said carriers is positioned in the path of one of said carrier means by rotation of said feeder shaft, and said cam activates said second microswitch upon making a single revolution of said feeder shaft to stop further rotation of said feeder shaft.

7. The apparatus of claim 1 wherein:
   a. said drive means is an electric motor and a cooperating drive chain and drive motor sprocket system and is located on said frame;
   b. said conveyor is a conveyor chain and said plurality of carrier means is a plurality of carrier mechanisms carried by said conveyor chain and fitted with carrier turn pins and cooperating L hooks pivotally mounted in said carrier mechanisms for sequentially engaging said carriers, transporting said carriers around the periphery of said frame as said carriers are positioned for engagement by said release means, and rotating into collection position to effect collection of said carriers after said frog food has been removed from said carriers;
   c. said carriers are shaped hooks having a line attached thereto and carrying a particle of frog food on the opposite end of said line;
   d. said release means comprises a first microswitch mounted on said frame and positioned in close proximity to the path of said conveyor chain to contact each of said carrier mechanisms as said carrier mechanisms traverse said frame and sequentially pass said first microswitch; a feeder motor carried by said frame and in electrical cooperation with said first microswitch; a second microswitch carried by said frame and in electrical cooperation with said feeder motor; and a threaded feeder shaft carrying a plurality of carriers on respective threads thereof and rotatably carried by said feeder motor, said threaded feeder shaft also supporting a cam in perpendicular relationship, whereby when said first microswitch is activated in sequence by each of said carrier means as said conveyor chain traverses said frame, said feeder motor is activated, said feeder shaft and said cam are caused to rotate, one of said carriers is positioned in the path of one of said carrier means by rotation of said feeder shaft, and said cam activates said second microswitch upon making a single revolution of said feeder shaft to stop further rotation of said feeder shaft.

8. The apparatus of claim 1 wherein said collection means is a wire member mounted on said frame and positioned in the path of said carriers to sequentially engage and remove said carriers from said carrier means as said carrier means traverse said frame.

9. The apparatus of claim 1 wherein:
   a. said drive means is an electric motor and a cooperating drive chain and drive motor sprocket system;

b. said conveyor is a conveyor chain and said plurality of carrier means is a plurality of carrier mechanisms carried by said conveyor chain and fitted with carrier turn pins and cooperating L hooks pivotally mounted in said carrier mechanisms for sequentially engaging said carriers as said carriers are positioned for engagement by said release means transporting said carriers around the periphery of said frame and positioning said carriers for engagement with said collection means after said frog food has been removed from said carriers;

c. said carriers are shaped hooks having a line attached thereto and carrying a particle of frog food on the opposite end of said line;

d. said release means comprises a first microswitch mounted on said frame and positioned in close proximity to the path of said conveyor chain to contact each of said carrier mechanisms as said carrier mechanism traverse said frame and sequentially pass said microswitch; a feeder motor carried by said frame and in electrical cooperation with said first microswitch; a second microswitch carried by said frame and in electrical cooperation with said feeder motor; and a threaded feeder shaft carrying a plurality of carriers on respective threads thereof, and rotatably carried by said feeder motor, said threaded feeder shaft also supporting a cam in perpendicular relationship, whereby when said first microswitch is activated in sequence by each of said carrier means as said conveyor chain traverses said frame, said feeder motor is activated and said feeder shaft and said cam are caused to rotate, one of said carriers is positioned in the path of one of said carrier means by rotation of said feeder shaft and said cam activates said second microswitch upon making a single revolution of said feeder shaft to stop further rotation of said feeder shaft; and e. said collection means is a wire member mounted on said frame and positioned in the path of said carriers to seqentially engage and remove said carriers from said L hooks as said carrier mechanisms traverse said frame.

10. The apparatus of claim 9 further including carrier L hook turners mounted on said frame and positioned to engage said carrier turn pins and effect selective orientation of said carrier L hooks to sequentially receive and discharge said carriers.

* * * * *